United States Patent [19]

O'Brien-Bernini et al.

[11] Patent Number: 5,312,470
[45] Date of Patent: May 17, 1994

[54] APPARATUS FOR PRODUCING GLASS FIBERS

[75] Inventors: Frank O'Brien-Bernini, Granville; Jay W. Hinze, Newark, both of Ohio

[73] Assignee: Owens-Corning Fiberglas Technology Inc., Summit, Ill.

[21] Appl. No.: 20,955

[22] Filed: Feb. 22, 1993

[51] Int. Cl.$^5$ ............................................. C03B 37/02
[52] U.S. Cl. ...................................... 65/12; 65/374.11
[58] Field of Search ........................ 65/2, 12, 374.11

[56] References Cited

U.S. PATENT DOCUMENTS

| | | | |
|---|---|---|---|
| 3,345,147 | 10/1967 | Russell | 65/12 |
| 3,492,104 | 1/1970 | Glaser | 65/12 X |
| 3,695,858 | 10/1972 | Russell | 65/2 |
| 3,841,853 | 10/1974 | Higginbotham et al. | 65/12 |
| 3,867,118 | 2/1975 | Russell | 65/3.1 |
| 4,055,406 | 10/1977 | Slonaker et al. | 65/12 X |
| 4,662,922 | 5/1987 | Hill et al. | 65/2 |
| 4,846,865 | 7/1989 | Hinze | 65/1 |

Primary Examiner—Robert L. Lindsay
Attorney, Agent, or Firm—Ted C. Gillespie; Catherine B. Martineau

[57] ABSTRACT

This disclosure depicts a feeder or bushing where the heat transfer members or fin shields have outwardly disposed surfaces with a ceramic coating bonded to those surfaces. The heat transfer surfaces also are in direct contact with and adjacent to the discharge wall of the feeder where they act as support members to support the discharge wall. This combination is especially useful in designing feeders or bushings with a greater number of orifices.

22 Claims, 3 Drawing Sheets

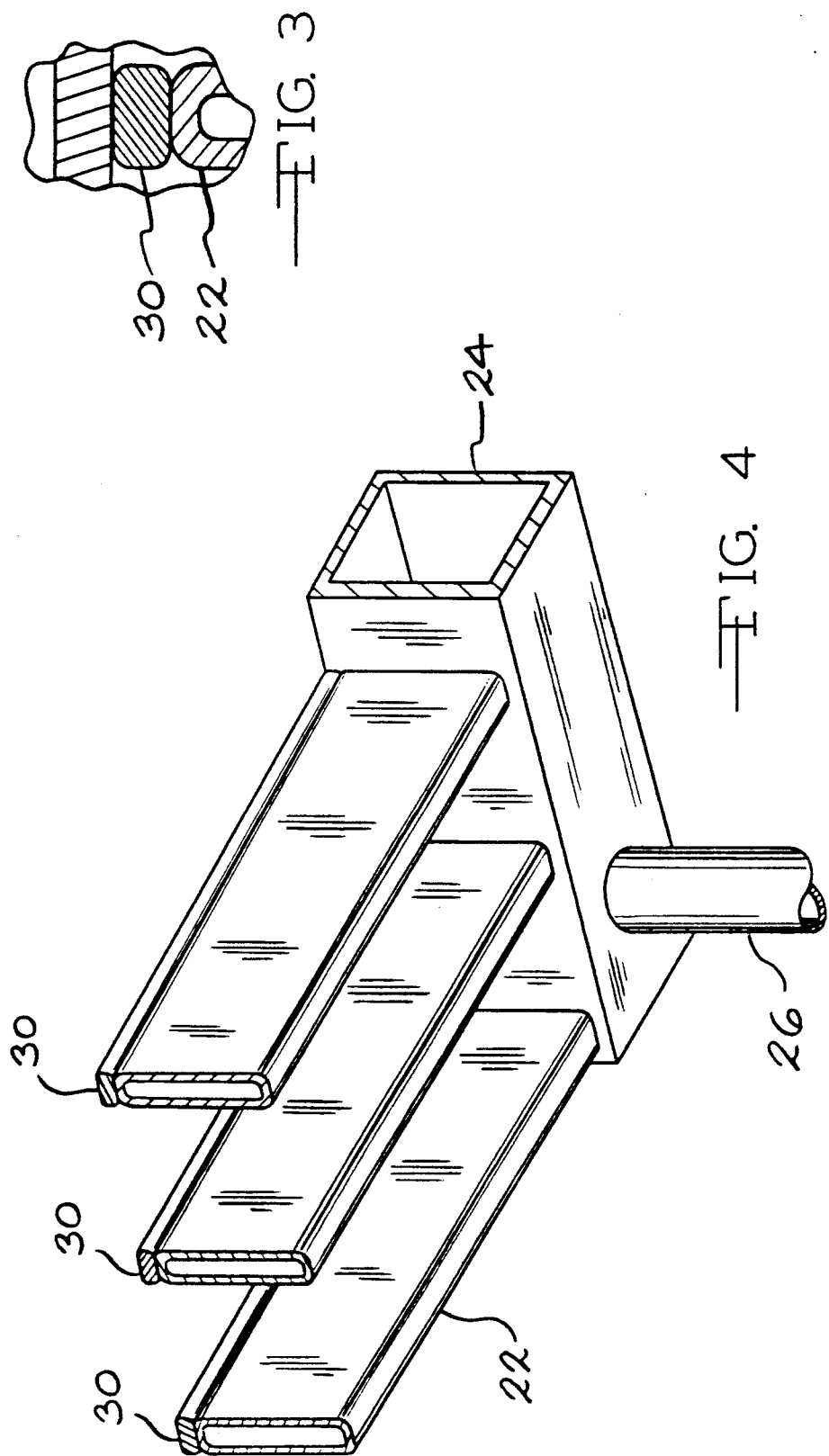

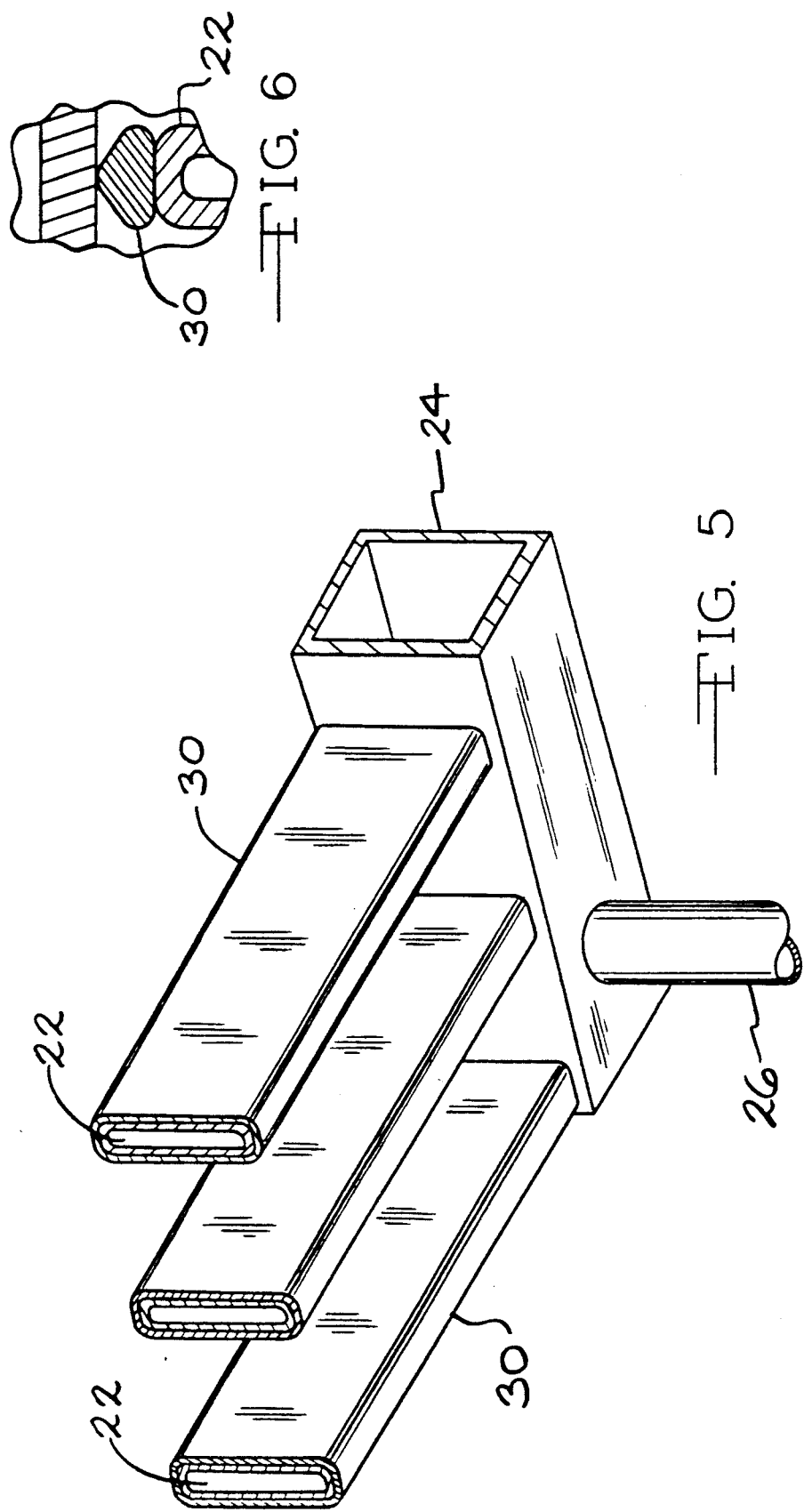

APPARATUS FOR PRODUCING GLASS FIBERS

DESCRIPTION

1. Technical Field

Our development relates to the art of manufacturing fibers from heat-softenable material such as glass. More especially, our development relates to an apparatus for forming glass fibers.

2. Background Art

We exemplify our development by reference to the production of continuous glass fibers wherein streams of molten glass are attenuated mechanically into continuous fibers of small diameter and then grouped into a strand and wound onto a package.

In production of "textile" or continuous glass filaments there has been a never ending quest to increase the throughput and operating efficiency of the filament forming systems. To increase the throughput, some feeders have been designed with a greater number of orifices, while other systems have attempted to increase throughput by raising the operating temperature of the feeder and of the glass. In either case, the cooling systems must remove more heat. One of the most widely employed cooling systems consists of a plurality of heat transfer members or fin shields that are attached to a water cooled header or manifold for removing heat from the forming zone and glass.

The industry has been manufacturing glass fibers for many years using precious metal bushings, or glass feeders. Such glass feeders include a foraminous bottom plate, or wall, commonly referred to in the art as a tip plate, which retains a pool of molten glass. Streams of molten glass issue from the openings, or tips, in the bottom bushing wall. By suitable means the streams of glass are then attenuated and collected in the form of fibers. Such glass feeders, or bushings, must be chemically resistant to the action of molten glass and must be dimensionally stable at high operating temperatures. Currently, such bushings are manufactured of a precious metal, which term includes elemental precious metals or alloys, such as platinum or platinum and rhodium alloys.

Precious metal bushings also tend to creep or deform in service. The creep or deformation adversely effects fiber quality. The deformation or "sag" requires the bushing to be prematurely removed from service. If corrosive affects don't take their toll on the feeder, "sag" does.

DISCLOSURE OF INVENTION

We have developed a feeder or bushing where the heat transfer members or fin shields have outwardly disposed surfaces with a ceramic coating bonded to those surfaces. The heat transfer surfaces also are in direct contact with and adjacent to the discharge wall of the feeder where they act as support members to support the discharge wall. Typically, the bottom wall of the feeder is the discharge wall. This combination is especially useful in designing feeders or bushings having a greater number of orifices.

BRIEF DESCRIPTION OF THE DRAWINGS

FIG. 3 is an enlargement showing only the ceramic coating touching the heat transfer member.

FIG. 4 is an enlargement showing the ceramic coating bonded only to the crown of the heat transfer members.

FIG. 5 is an enlargement showing the ceramic coating bonded to all the surfaces of the heat transfer members.

FIG. 6 is an enlargement showing only the tip of a triangular shaped ceramic coating touching heat transfer member.

BEST MODE OF CARRYING OUT INVENTION

The outwardly disposed surfaces of the heat transfer members described in the disclosure must be isolated from the bushing surface by a ceramic material. Otherwise electrical and thermal short circuiting will occur. Ceramic rods or tubes placed atop the heat transfer member cannot be used because they do not have adequate thermal shock resistance. They will also crack or fall out of position during cleaning of the heat transfer members. Commercially available ceramic rods and tubes have high thermal conductivities which remove too much heat from the bushing.

We use a ceramic coating that is non-reactive with precious metal and is thermally shock-resistant under glass fiber making conditions. Silicon carbide and silicon nitride are not satisfactory materials because they react with the precious metal. Similarly, chromic oxide is not acceptable because it has poor thermal shock-resistance and poor strength. Aluminum oxide has a thermal conductivity that is too high. We have found thermal barrier ceramics to be best suited for our development. Typically these materials must maintain their strength at temperatures on the order of about 2100°–2600° F. The preferred ceramic material is a commercially available crystallographically stabilized zirconia. The zirconia is commonly stabilized against disintegration with materials such as calcia, magnesia, ceria, yttria and alumina. The most highly preferred material is a yttria stabilized zirconia. Generally the stabilizers are employed in amounts of about 6 to about 8% by weight (combined zirconia and stabilizer). Other suitable ceramics include alumina, titania, hafnia and their alloys, e.g., alumina-titania alloys.

The Yttria stabilized zirconia is the preferred material for this application because it has a very low thermal and electrical conductivity and has excellent thermal shock resistance. Unusually thick coatings (0.060 to 0.120 inch thick) are applied to the heat transfer members in order to prevent excessive heat loss from the bushing to the heat transfer members. This coating thickness is much greater than that commonly used in jet engine applications for thermal barrier coatings. The application of thick coatings to components such heat transfer members having thin cross sections is unique. It is made possible by a bond coat that separates the thermal barrier coating from the heat transfer member.

Figure 1:
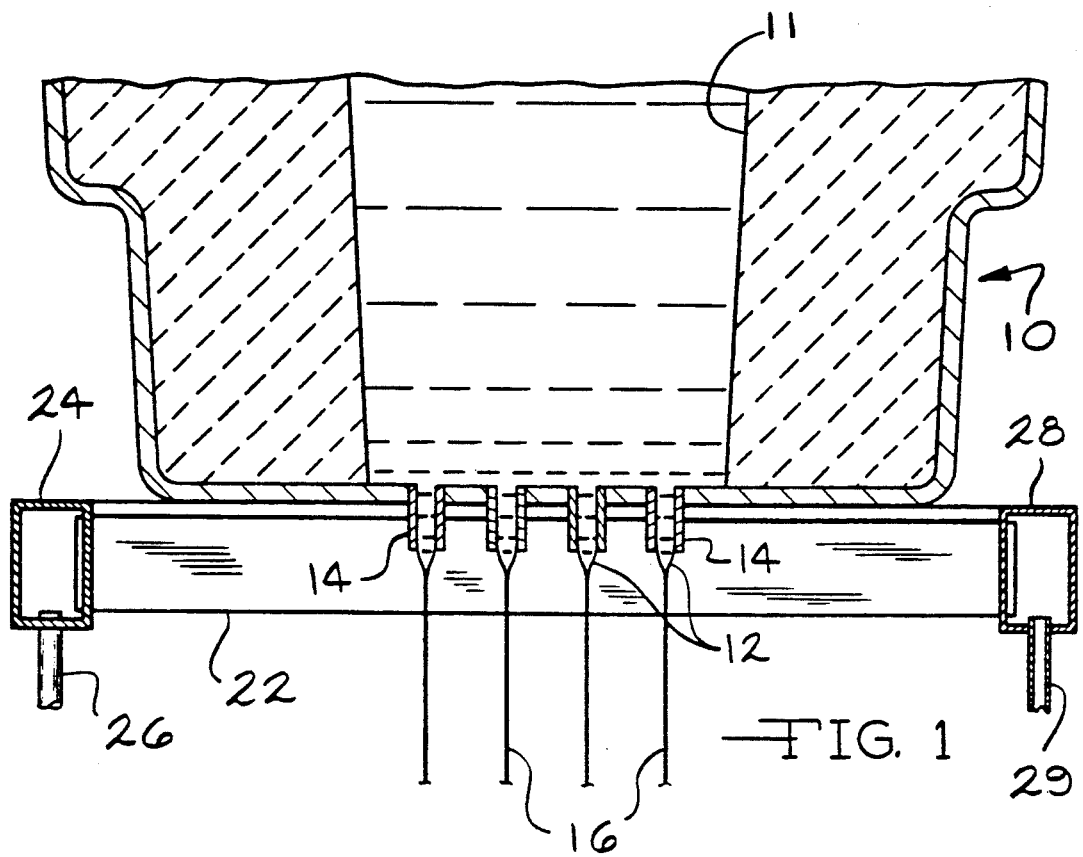
FIG. 1 is a side view, partly in cross section, of a glass feeder, heat transfer members and cooling manifold.

Referring now to the drawings, FIG. 1 illustrates a refractory furnace 10 for reducing the body of glass to a molten condition and having a bushing or feeder 11 associated therewith from which a plurality of streams of glass are emitted from orifices in the feeder for attenuation into fibers 16.

Heat transfer members 22 extend across the bottom of feeder 10 between feeder tips 14. Members 22 may divide tips 14 and cones 12 in a variety of arrangements. Typically, members 22 have one or two rows of tips 14 aligned therebetween. Members 22 extend from a longitudinal hollow header 24 disposed laterally with respect to the feeder. Cooling liquid is supplied to header 24 by way of a conduit 26 connected to header 24.

Figure 2:
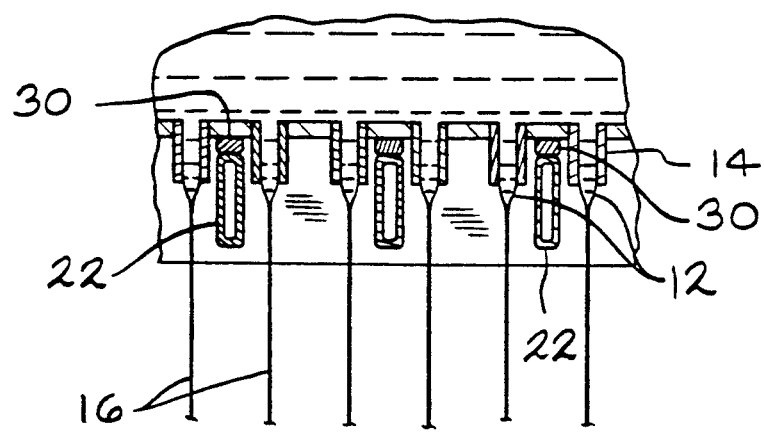
FIG. 2 is an end view showing the heat transfer members in contact with the discharge wall of the feeder.

FIG. 2 shows ceramic coating 30 on the crown of members 22. Only coating 30 touches the bottom of feeder 10.

FIG. 3 shows ceramic coating 30 bonded only to the crown of member 22.

FIG. 4 shows one section of heat transfer members 22 in enlarged detail. Three members 22 are shown with header 24 and conduit 26. Cooling fluid (not shown) passes through conduit 26 into hollow header 24. The cooling fluid then passes through hollow members 22 into hollow header 28 and exits through conduit 29. Header 28 and conduit 29 are shown in FIG. 1, but not in FIG. 3.

FIG. 5 shows ceramic coating 30 bonded to all the surfaces of members 22.

FIG. 6 shows ceramic coating 30 on the crown in a triangular shape.

Also not shown are glass fibers gathered into strands by drawing them over a gathering member while sizing fluid is applied to the fibers by a roll type applicator which supplies a sizing to each filament above the point of collection at the gathering member. The strands formed by the gathered fibers are packaged by a winder which collects the strand on a tube mounted on a rotating collet and traversed by a suitable traversing device such as a spiral wire traverse. The winder provides a force of attenuation for the fibers by reason of rotation of the collet which develops tension in each fiber to withdraw it from the molten glass flowing from the feeder.

Our development improves production efficiency and increases bushing life because it eliminates sag. Additionally it allows for a greater number of orifices in the tip plate due to the ability to make much larger tip plates than formerly practical. Additionally, the use of lower cost, lower rhodium content alloys (with higher creep rates) is possible due to the extensive support configuration. The development uses a unique ceramic topped water cooled fin arrangement to provide fiber quench, provide tip plate support, and allow the practical operation of bushings much larger than is the current "state-of-the-art".

To promote the satisfactory formation of glass streams of uniform size and characteristics, the industry flows glass through orificed tips at a comparatively low viscosity. On the other hand, it is essential to increase the viscosity of the glass streams adjacent the exterior of the tips to satisfactorily attenuate fine filaments from the streams. Therefore, means are provided for conveying heat away from the glass streams to raise the viscosity. Manifolds or headers are disposed at opposite sides of the streams and extend lengthwise of the feeder. Extending laterally from the manifolds are vanes or fin members. The fins are fused, welded or otherwise secured to the manifolds in heat conducting relation therewith. The manifolds are arranged to accommodate a circulating cooling fluid, for example, water. The fins absorb or withdraw heat from the streams and the heat conducted by the fins to the manifolds is carried away by the circulating fluid. In the preferred embodiment, our "fins" use internally water cooled members. The water can be passed through the manifold at a controlled rate of flow and at temperatures predetermined to establish desired temperature differentials between the fins and the glass emitted from the feeder tips. Through this arrangement, the withdrawal or extraction of heat from the streams of glass increases the viscosity of the glass to promote efficient attenuation of the streams to fine filaments.

When the bushing or feeder is relatively new, the feeder bottom is straight and conventional fins cover the tips uniformly. The glass cones or streams emitted from the tips are therefore of relatively uniform viscosity. However, this uniform coverage occurs only during the early stages of feeder life. After the feeder has been in operation for a time, the stresses resulting from the high temperatures, the glass weight and the tension caused by attenuation cause the bottom or tip sections to begin to sag. The more the bottom sags, the more uneven the fin coverage or shielding becomes.

With state of the art bushings, great effort is used to prevent the fins from touching the tips and bushing floor.

In our development we use ceramic topped fin blades to support the tip plate of the bushing.

Many variations of our invention are possible. While the entire fin may be ceramic coated, we prefer that only the crown be coated. Typical coating of the crown has a triangular shaped coating where only a small portion of the coating touches or "kisses" the bottom plate of the bushing. Other shapes are possible. The whole point of different shapes is to hold the point of contact to a minimum.

Many other variations of this are expected to be useful, including but not limited to detachable tip plates where the upper bushing body stays in position and only the supported tip section is replaced as needed. This may allow alternate upper body metals such as palladium or pure platinum, thus reducing the total bushing cost.

While we carried out our work with standard 0.060 inch thick tip plates, we fully expect significant tip plate thickness reductions and use of less costly higher creep rate alloys. For example, we carried out 2 trials with low Rhodium (10%) alloy as compared to "Industry Standards" of 20%–25% Rh. In addition, we anticipate using a reduced tip plate thickness in combination with a thin zirconia (plasma sprayed) coating on the tip plate. Our zirconia topped fin blades will provide support for the thinner tip plate.

We further expect that tip plate gussets will not be necessary nor will other support structures be needed. This will yield alloy and fabrication time savings.

We set the bushing up in conventional castable refractory within a typical metal frame. The manifolds are attached along the long frame sides (one per side) for easy assembly. The hollow, fluid carrying "fin blades" are topped with a ceramic, in this case a 0.120" thickness of zirconia plasma sprayed.

This arrangement will result in the zirconia topped, fluid cooled fin blades supporting the precious metal tip plate of the bushing. The thickness of the coated ceramic layer may vary but preferred thicknesses are on the order of about 0.060 to 0.250 inches.

We apply the ceramic coating with an arc-plasma spraying technique that is a well-known. The process uses a hot gas plasma to melt a particulate material and transfer it to a substrate where the material solidifies as a coating. Plasma is generally generated by passing a gas between two concentric electrodes where it is heated by a sustained high DC current. Temperatures can reach higher than 30,000° F. which causes the gas to expand and issue from the front electrode nozzle at a very high velocity. Downstream from the arc, powder is injected via a convenient carrier gas and mixed with the powder is injected via a convenient carrier gas and mixed with the plasma. The powder melts and is carried to the article where it bonds to form a dense strongly bonded coating.

The ceramic clad, supportive fins we developed extend the useful life of the feeder. It especially allows for more orifices in the tip plate. In some instances, the useful life of the feeders has been extended by over twenty-five percent by using our supportive, ceramic-coated fin shields. We expect impovernments of two or three times the life once we work out the "practical" details for production (good heat pattern, etc.).

For products needing multi-package yardage balance, the current injection system of U.S. Pat. No. 4,780,120 is the preferred method to achieve individual package yardage control.

We claim:

1. Apparatus for producing continuous filaments for streams of molten inorganic material comprising:
   feeder means having a discharge wall having orifices adapted to define the streams;
   attenuation means for mechanically drawing the molten streams into continuous filaments, the filaments advancing along a path;
   heat transfer means extending between the orifices adapted to remove heat from the molten streams, the heat transfer members being in direct contact with and adjacent to the discharge wall to act as a support member to support the discharge wall, the heat transfer members including outwardly disposed surfaces having bonded thereto a coating of crystallographically stabilized zirconia.

2. An apparatus according to claim 1, wherein the zirconia coating is bonded to all the surfaces of the heat transfer members.

3. An apparatus according to claim 1, wherein the heat transfer members have a crown surface wherein the zirconia coating is only bonded to the crown surface and wherein only the zirconia coated crown surface touch the discharge wall.

4. An apparatus according to claim 1, wherein only a small portion of the zirconia coating touches the discharge wall.

5. An apparatus according to claim 3, wherein the zirconia coating on the crown surface has a triangular shape.

6. An apparatus according to claim 1, wherein the zirconia is stabilized with an effective amount of a material selected from the group consisting of yttria, calcia, magnesia, ceria, and alumina.

7. An apparatus according to claim 1, wherein the zirconia coating has a thickness of 0.060 to 0.250 inches.

8. An apparatus according to claim 1, wherein the zirconia coating has a thickness of 0.120 inches.

9. An apparatus according to claim 1, wherein the zirconia coating is directly bonded to the heat transfer members by arc-plasma spraying.

10. An apparatus according to claim 1, wherein the feeder means has a bottom wall which is the discharge wall.

11. An apparatus according to claim 1, wherein the feeder means has outwardly disposed surfaces with a ceramic coating bonded to the surfaces.

12. Apparatus for producing continuous filaments from streams of molten inorganic material comprising:
    feeder means having a discharge wall having orifices adapted to define the streams;
    attenuation means for mechanically drawing the molten streams into continuous filaments, the filaments advancing along a path;
    heat transfer members extending between the orifices to remove heat from the molten streams, the heat transfer members being in direct contact with and adjacent to the discharge wall to act as a support member to support the discharge wall, the heat transfer members including outwardly disposed surfaces having bonded thereto a coating of zirconia crystallographically stabilized with an effective amount of yttria, the heat transfer members each having a length and two ends; and
    manifolds connected to each end of the heat transfer members extending substantially perpendicularly to the lengths of the heat transfer members.

13. An apparatus according to claim 12, wherein the zirconia coating is bonded to all the surfaces of the heat transfer members.

14. An apparatus according to claim 12, wherein the heat transfer members have a crown surface wherein the zirconia coating, is only bonded to the crown surface and wherein only the zirconia coated crown surface touches the discharge wall.

15. An apparatus according to claim 12, wherein only a small portion of the zirconia coating touches the discharge wall.

16. An apparatus according to claim 14, wherein the zirconia coating on the crown surface has a triangular shape.

17. An apparatus according to claim 12, wherein the manifolds and members are hollow with inlet and outlet apertures which allow cooling fluid to pass from manifold through the members and exit the other manifold.

18. An apparatus according to claim 12, wherein the feeder means has outwardly disposed surfaces with a ceramic coating bonded to all the surfaces of the feeder means.

19. An apparatus according to claim 12, wherein the zirconia coating has a thickness of 0.060 to 0.250 inches.

20. An apparatus according to claim 12, wherein the ceramic coating has a thickness of 0.120 inches.

21. An apparatus according to claim 12, wherein the heat transfer members have thin cross sections and the zirconia coating is thick in comparison to the thin sections.

22. An apparatus according to claim 6, wherein the material is yttria.

* * * * *